(12) United States Patent
Tseng

(10) Patent No.: US 6,302,614 B1
(45) Date of Patent: Oct. 16, 2001

(54) QUICK COUPLING ARRANGEMENT FOR A TELESCOPIC SHAFT

(76) Inventor: Yun-Chih Tseng, No. 7-5, Pa Chang Li, Pa Te Tsun, Lung Tan, Taoyuan Hsien (TW)

( * ) Notice: Subject to any disclaimer, the term of this patent is extended or adjusted under 35 U.S.C. 154(b) by 0 days.

(21) Appl. No.: 09/505,994

(22) Filed: Feb. 17, 2000

(51) Int. Cl.[7] .................................................. F16B 7/14
(52) U.S. Cl. ................................... 403/109.5; 403/379.6; 248/125.8
(58) Field of Search ................................. 248/125.8, 159; 403/109.1, 109.4, 109.5, 109.7, 377, 379.6

(56) References Cited

U.S. PATENT DOCUMENTS

| | | | |
|---|---|---|---|
| 4,238,164 | * | 12/1980 | Mazzola ........................ 403/109.5 X |
| 5,876,147 | * | 3/1999 | Longo ................................ 403/109.5 |
| 6,202,663 | * | 3/2001 | Uemura ........................ 403/109.5 X |

* cited by examiner

Primary Examiner—Lynne H. Browne
Assistant Examiner—John R. Cottingham
(74) Attorney, Agent, or Firm—Dougherty & Troxell

(57) ABSTRACT

A quick coupling arrangement installed in a telescopic shaft between an upper shaft section, including a bushing fixedly fastened to the bottom end of the upper shaft section, a tapered, threaded connector fixedly fastened to the top end of the lower shaft section, and a split, peripherally embossed screw cap threaded onto the threaded connector and rotated relative to the connector between a first position where the screw cap is radially expanded and forced into engagement with the inside wall of the upper shaft section to stop the lower shaft section from axial movement relative to the upper shaft section, and a second position where the screw cap is released from the inside wall of the upper shaft section for enabling the lower shaft section and the upper shaft section to be moved axially relative to each other.

1 Claim, 6 Drawing Sheets

QUICK COUPLING ARRANGEMENT FOR A TELESCOPIC SHAFT

BACKGROUND OF THE INVENTION

The present invention relates to a quick coupling arrangement installed in a telescopic shaft between an upper shaft section and a lower shaft section, and rotated between two positions to lock/unlock the upper shaft section and the lower shaft section.

There is known a prior art telescopic shaft for a golf club, comprised of three cylindrical shaft sections, which slide one inside another. The upper and intermediate shaft sections of the telescopic shaft each have an external thread. Screw caps are respectively moved on the intermediate shaft section and the lower shaft section, and respectively threaded onto the external thread on the upper shaft section and the external thread on the intermediate shaft section to lock the telescopic shaft in the operative position. The main drawback of this structure of telescopic shaft is the complicated operation procedure to lock/unlock the shaft sections. Further, because the screw caps are disposed on the outside of the telescopic shaft, they destroy the sense of beauty of the golf club.

SUMMARY OF THE INVENTION

The present invention has been accomplished to provide a quick coupling arrangement for a telescopic shaft, which eliminates the aforesaid drawbacks. It is one object of the present invention to provide a quick coupling arrangement for a telescopic shaft, which is easy to operate. It is another object of the present invention to provide a quick coupling arrangement for a telescopic shaft, which is kept from sight when installed. According to one aspect of the present invention, the quick coupling arrangement is installed in a telescopic shaft between an upper shaft section, which has a neck near a bottom end thereof, and a lower shaft section, which is slidably inserted into the upper shaft section, and rotated between a locking position where the upper shaft section and the lower shaft section are prohibited from axial movement relative to each other, and an unlocking position where the upper shaft section and the lower shaft section are allowed to be moved axially relative to each other, the quick coupling arrangement comprising: a connector fixedly fastened to a top end of the lower shaft section and moved with the lower shaft section in the upper shaft section above the neck of the upper shaft section, the connector comprising a cylindrical mounting base disposed at one end and plugged into the top end of the lower shaft section, a tapered coupling body disposed outside the lower shaft section and suspended inside the upper shaft section, and a collar raised around the periphery thereof between the mounting base and the tapered coupling body and stopped outside the lower shaft section and moved with the lower shaft section in the upper shaft section above the neck of the upper shaft section, the tapered coupling body comprising a double thread, a top stop flange, and a neck disposed between the double thread and the top stop flange; and a screw cap mounted on the tapered coupling body of the connector and moved between the top stop flange and collar of the connector, the screw cap comprising a longitudinal split, an embossed peripheral wall for engagement with an inside wall of the upper shaft section, a tapered coupling hole, which receives the tapered coupling body of the connector, and an internal thread disposed in the tapered coupling hole and threaded onto the double thread of the tapered coupling body of the connector. According to another aspect of the present invention, the quick coupling arrangement further comprises a bushing fixedly fastened to the bottom end of the upper shaft section to guide axial movement of the lower shaft section in the upper shaft section, the bushing having a top end stopped at the neck inside the upper shaft section and a bottom end terminating in a hooked flange hooked on the bottom end of the upper shaft section.

DETAILED DESCRIPTION OF THE PREFERRED EMBODIMENT

Figure 1:
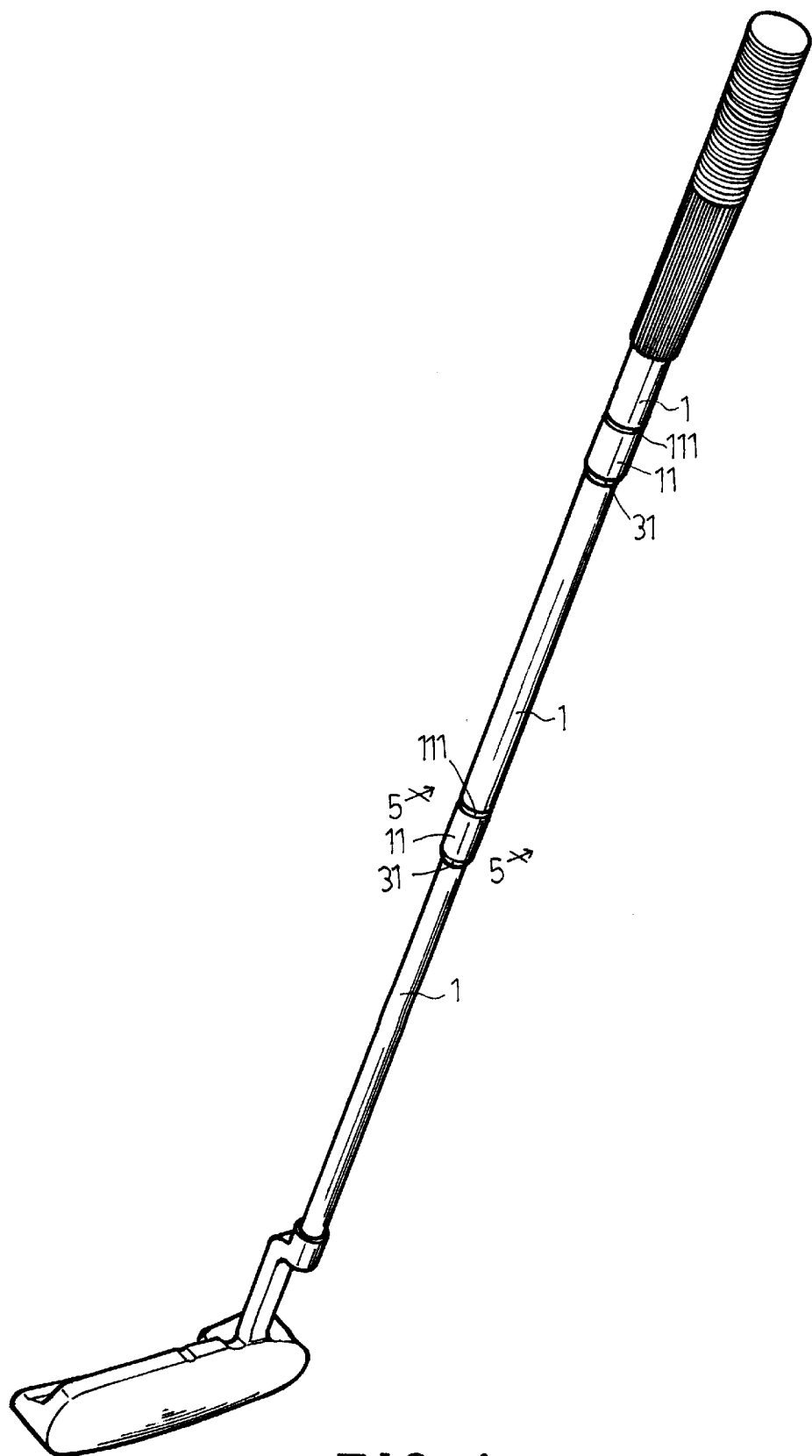
FIG. 1 is a perspective view of a golf club constructed according to the present invention.
Figure 2:
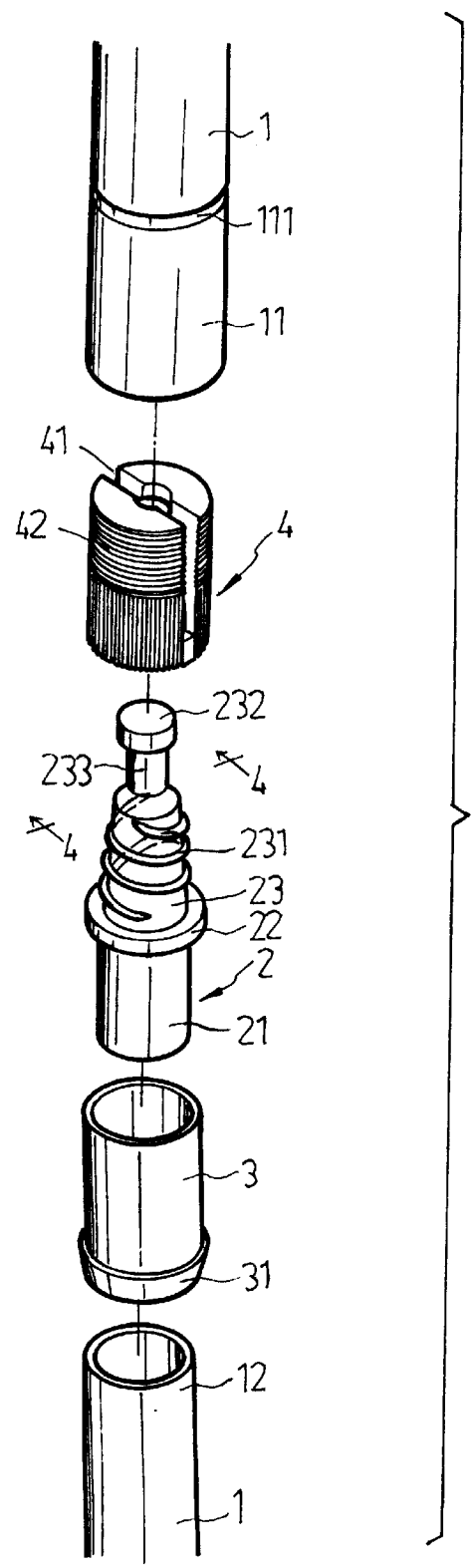
FIG. 2 is an exploded view of the preferred embodiment of the present invention.
Figure 3:
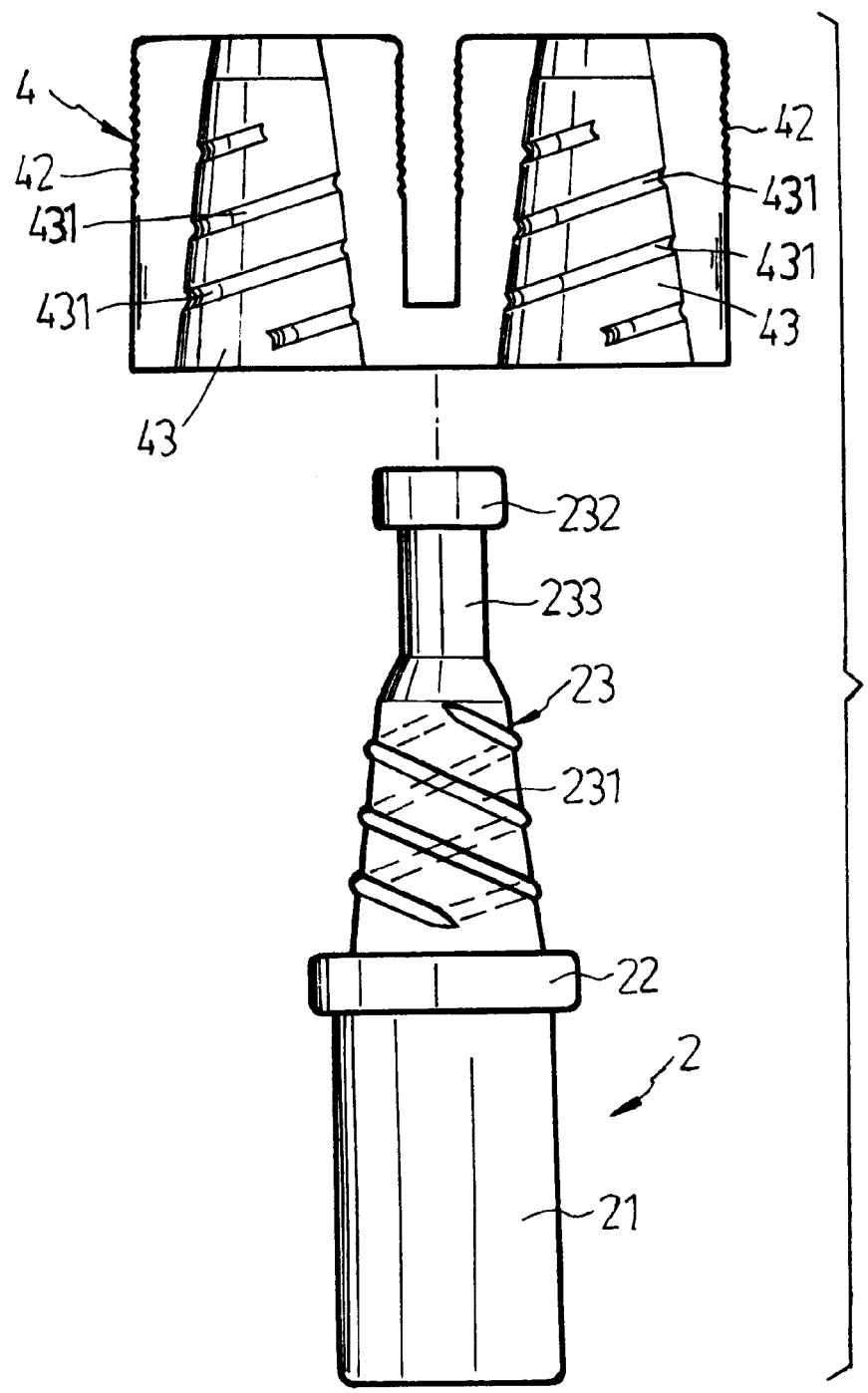
FIG. 3 is a schematic drawing showing a perspective status of the connector and an extended-out status of the screw cap according to the present invention.
Figure 4:
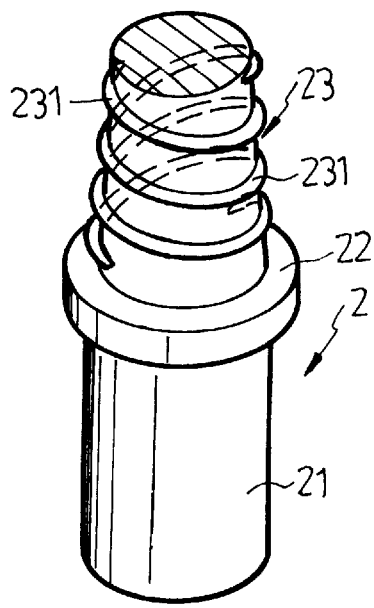
FIG. 4 is a sectional view taken along line 4—4 of FIG. 2.

Referring to FIGS. from 1 through 4, a quick coupling arrangement in accordance with the present invention is used in the telescopic shaft 1 of a golf club. The quick coupling arrangement comprises an upper shaft section 11 of greater diameter, and a lower shaft section 12 of smaller diameter. The upper shaft section 11 has a neck 111 near the bottom end thereof. The inner diameter of the neck 111 is not less than the outer diameter of the lower shaft section 12. A bushing 3 is fixedly fastened to the inside wall of the upper shaft section 11, having a top end stopped at the neck 111 and a bottom end terminating in a hooked flange 21 hooked on the bottom end of the upper shaft section 11. The lower shaft section 12 is slidably inserted through the bushing 3 into the inside of the upper shaft section 11. A connector 2 is fastened to the top end of the lower shaft section 12. A screw cap 4 mounted inside the upper shaft section 11 and fastened to the connector 2. The connector 2 comprises a cylindrical mounting base 21 disposed at one end and plugged into the lower shaft section 12, a tapered coupling body 23 disposed at an opposite end, and a collar 22 raised around the periphery between the mounting base 21 and the tapered coupling body 23 and stopped outside the lower shaft section 12 and moved with the lower shaft section 12 in the upper shaft section 11 above the neck 111. The tapered coupling body 23 comprises a double thread 231, a top stop flange 232, and a neck 233 disposed between the double thread 231 and the top stop flange 232. The screw cap 4 comprises a longitudinal split 41, an embossed peripheral wall 42, a tapered coupling hole 43 extended through the central axis thereof, and an internal thread 431 in the tapered coupling hole 43. The screw cap 4 is threaded onto the double thread 231 on the tapered coupling body 23, and the neck 233 of the tapered coupling body 23 is extended out of the tapered coupling hole 43 of the screw cap 4.

Figure 5:
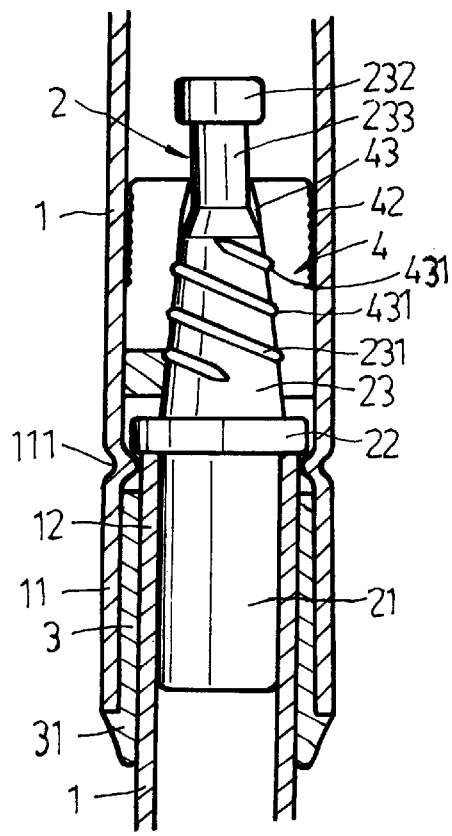
FIG. 5 is a sectional view taken along line 5—5 of FIG. 1.
Figure 6:
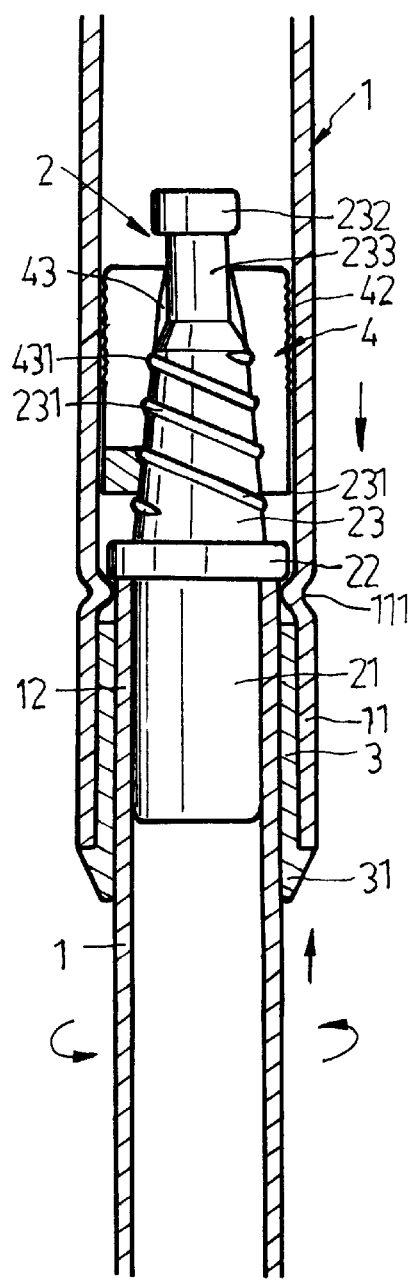
FIG. 6 is a sectional view showing the locking procedure according to the present invention.

Referring to FIGS. 5 and 6, due to the limitation of the top stop flange 232 and collar 22 of the connector 2, the screw cap 4 can only be moved along the tapered coupling body 23 within a limited distance. When the upper shaft section 1 is pushed downwards and then rotated, the internal thread 431 of the screw cap 4 is fastened up with the double thread 231 of the tapered coupling body 23 and forced to expand, causing the embossed peripheral wall 42 of the screw cap 4 to be forced into engagement with the inside wall of the upper shaft section 11, and therefore the upper shaft section 11 and the lower shaft section 12 are prohibited from axial movement relative to each other.

Figure 7:
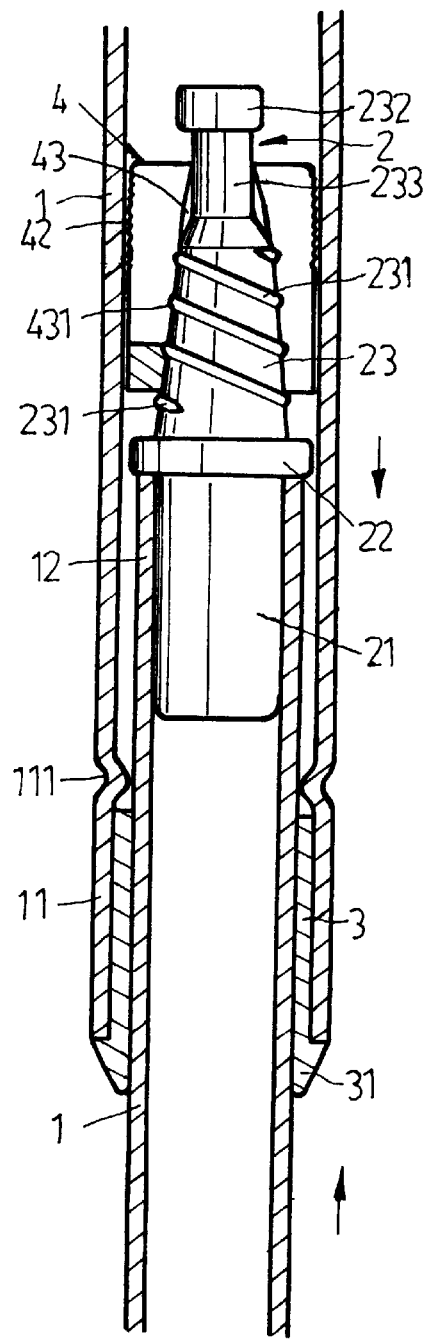
FIG. 7 is a sectional view showing the screw cap loosened, the lower shaft section moved relative to the upper shaft section according to the present invention.
Figure 8:
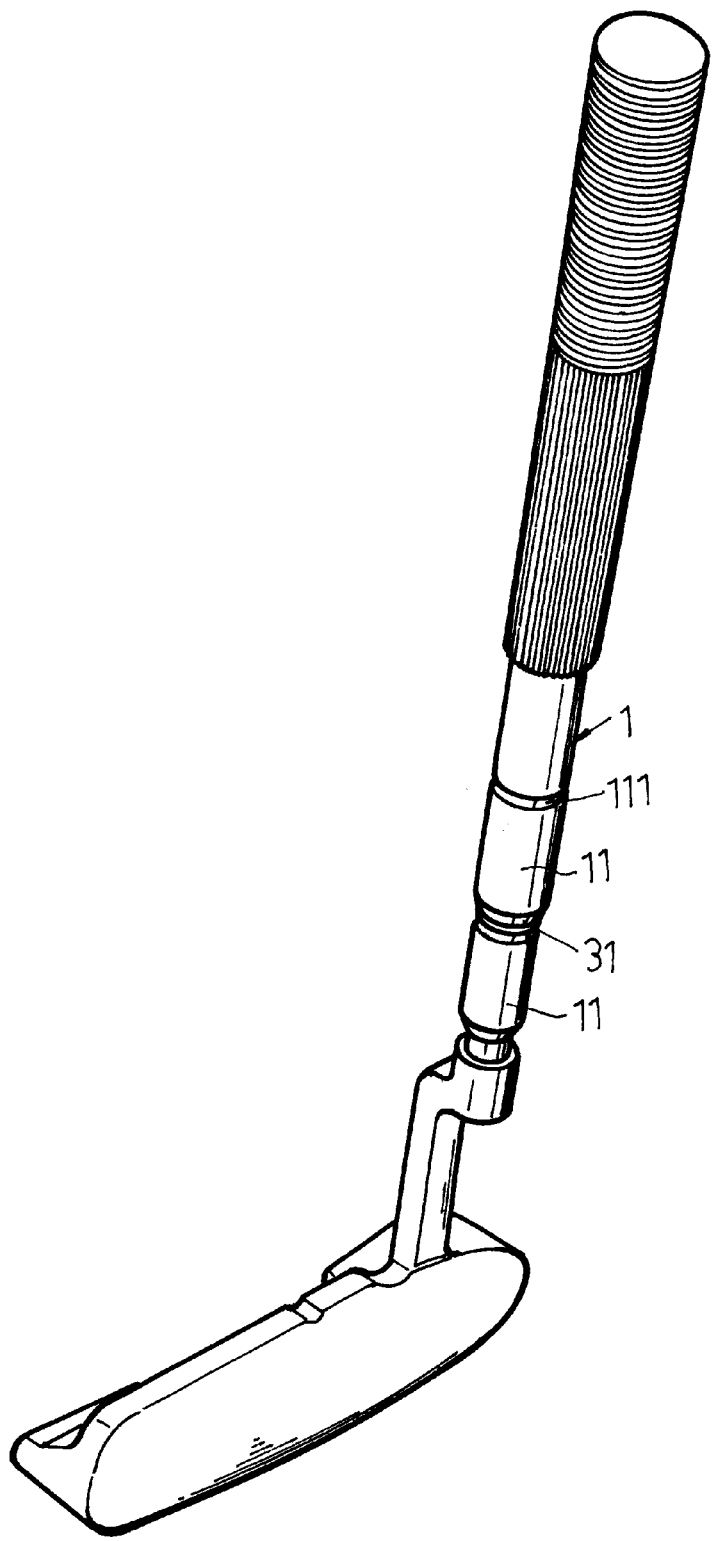
FIG. 8 shows the collapsed status of the golf club shown in FIG. 1.

Referring to FIGS. 7 and 8, when the lower shaft section 12 is rotated relative to the upper shaft section 11 in the reversed direction, the screw cap 4 is loosed from the tapered coupling body 23, and the radially outwardly expanding force is released from the inside wall of the screw cap 4, thereby causing the embossed peripheral wall 42 to be disengaged from the inside wall of the upper shaft section 11 for enabling the lower shaft section 12 to be moved axially in and out of the upper shaft section 11 between the extended position shown in FIG. 1 and the collapsed position shown in FIG. 8

While only one embodiment of the present invention has been shown and described, it will be understood that various modifications and changes could be made thereunto without departing from the spirit and scope of the invention disclosed.

What the invention claimed is:

1. A quick coupling arrangement installed in a telescopic shaft between an upper shaft section, which has a neck near a bottom end thereof, and a lower shaft section, which is slidably inserted into said upper shaft section, and rotated between a locking position where said upper shaft section and said lower shaft section are prohibited from axial movement relative to each other, and an unlocking position where said upper shaft section and said lower shaft section are allowed to be moved axially relative to each other, the quick coupling arrangement comprising:

a connector fixedly fastened to a top end of said lower shaft section and moved with said lower shaft section in said upper shaft section above the neck of said upper shaft section, said connector comprising a cylindrical mounting base disposed at one end and plugged into the top end of said lower shaft section, a tapered coupling body disposed outside said lower shaft section and suspended inside said upper shaft section, and a collar raised around the periphery thereof between said mounting base and said tapered coupling body and stopped outside said lower shaft section and moved with said lower shaft section in said upper shaft section above the neck of said upper shaft section, said tapered coupling body comprising a double thread, a top stop flange, and a neck disposed between said double thread and said top stop flange;

a screw cap mounted on said tapered coupling body of said connector and moved between the top stop flange and collar of said connector, said screw cap comprising a longitudinal split, an embossed peripheral wall for engagement with an inside wall of said upper shaft section, a tapered coupling hole, which receives the tapered coupling body of said connector, and an internal thread disposed in said tapered coupling hole and threaded onto said double thread of said tapered coupling body of said connector; and, a bushing fixedly fastened to the bottom end of said upper shaft section to guide axial movement of said lower shaft section in said upper shaft section, said bushing having a top end stopped at the neck inside said upper shaft section and a bottom end terminating in a hooked flange hooked on the bottom end of said upper shaft section.

\* \* \* \* \*